US009103494B2

(12) United States Patent
Yoon

(10) Patent No.: US 9,103,494 B2
(45) Date of Patent: Aug. 11, 2015

(54) ASSEMBLY APPARATUS

(75) Inventor: Soo Yong Yoon, Seoul (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 509 days.

(21) Appl. No.: 13/312,680

(22) Filed: Dec. 6, 2011

(65) Prior Publication Data

US 2012/0176752 A1 Jul. 12, 2012

(30) Foreign Application Priority Data

Jan. 12, 2011 (KR) ........................ 10-2011-0003225

(51) Int. Cl.
*F16M 11/08* (2006.01)
*F16M 11/04* (2006.01)

(52) U.S. Cl.
CPC ............... *F16M 11/08* (2013.01); *F16M 11/04* (2013.01)

(58) Field of Classification Search
CPC ........... F16M 11/08; F16M 11/04; G06F 1/16
USPC .................. 361/807, 809, 810, 748, 720, 361/679.01–679.06, 600, 679.22–679.25; 248/415, 560, 627–677, 121, 126, 127, 248/200, 317, 917–924; 345/204, 205, 206, 345/1.1, 1.3, 156, 168, 169; 257/727; 349/56, 58, 59, 60; 174/52.1
See application file for complete search history.

(56) References Cited

U.S. PATENT DOCUMENTS 5,109,572 A * 5/1992 Park ............................... 16/334
6,024,335 A * 2/2000 Min ............................... 248/371
6,189,850 B1 * 2/2001 Liao et al. ................. 248/292.14
6,330,993 B1 * 12/2001 Cho ............................... 248/371
6,484,994 B2 * 11/2002 Hokugoh ...................... 248/371
2007/0080471 A1 * 4/2007 Yazawa ......................... 257/783
2007/0152114 A1 * 7/2007 Choi ............................. 248/168
2009/0122280 A1 * 5/2009 Kuroda ......................... 353/119
2010/0177471 A1 * 7/2010 Spivey ..................... 361/679.02

FOREIGN PATENT DOCUMENTS

| CN | 1949486 | 4/2007 |
|---|---|---|
| JP | 2007-109794 | 4/2007 |
| KR | 20-2000-0010712 | 6/2000 |
| KR | 10-0306086 | 8/2001 |
| KR | 10-2007-0121140 | 12/2007 |

OTHER PUBLICATIONS

English Machine Translation of KR 10-0306086.*

* cited by examiner

*Primary Examiner* — Jenny L Wagner
*Assistant Examiner* — Ahmad D Barnes
(74) *Attorney, Agent, or Firm* — Robert E. Bushnell, Esq.

(57) ABSTRACT

An assembly apparatus is provided. The assembly apparatus includes a fixed apparatus that includes a body element, a first fixed element protruding from an outer curved surface of the body element in a radial direction of the body element, and a second fixed element extending in a first direction that is vertical to the radial direction of the body element, and a support apparatus that includes a first receiving element in which the first fixed element is inserted, rotated, and fixed, and a second receiving element in which the second fixed element is inserted, rotated, and fixed. An end of the second fixed element is connected to the body element. Another end of the second fixed element protrudes from a lower surface of the body element.

14 Claims, 8 Drawing Sheets

ASSEMBLY APPARATUS

CLAIM OF PRIORITY

This application makes reference to, incorporates the same herein, and claims all benefits accruing under 35 U.S.C. §119 from an application earlier filed in the Korean Intellectual Property Office on Jan. 12, 2011 and there duly assigned Serial No. 10-2011-0003225.

BACKGROUND OF THE INVENTION

1. Field of the Invention

The present disclosure herein relates to an assembly apparatus.

2. Description of the Related Art

Electronic appliances including TVs, computers, and cellular phones are formed by combining various components. As electronic industries such as semiconductor industries and display industries grow, the demand for electronic appliances having various functions and enhanced performances is increasing. Accordingly, the number of components constituting electronic appliances is also increasing.

When an electronic appliance including unstably fixed and assembled components is damaged, the components may become disassembled and may be removed or move within the electronic appliance. This may cause a malfunction of the electronic appliance and reduce the reliability thereof. Accordingly, various types of research for stably fixing and assembling various components of an electronic appliance are being carried out.

SUMMARY OF THE INVENTION

The present disclosure provides an assembly apparatus that is stably fixed.

Embodiments of the inventive concept provide assembly apparatuses including: a fixed apparatus having a fixed region that includes a body element, a first fixed element protruding from an outer curved surface of the body element in a radial direction of the body element, and a second fixed element extending in a first direction that is vertical to the radial direction of the body element; and a support apparatus having a receiving region that includes a first receiving element in which the first fixed element is inserted, rotated, and fixed, and a second receiving element in which the second fixed element is inserted, rotated, and fixed, wherein an end of the second fixed element is connected to the body element, and another end of the second fixed element protrudes from a lower surface of the body element.

In some embodiments, the first fixed element and the first receiving element may fix the fixed apparatus to the support apparatus in the first direction.

In other embodiments, the second fixed element and the second receiving element may fix the fixed apparatus to the support apparatus in a rotation direction on an axis extending in the first direction.

In still other embodiments, the fixed apparatus may further include a third fixed element extending in the first direction and spaced apart from the second fixed element, an end of the third fixed element may be connected to the body element, and another end of the third fixed element may protrude from the lower surface of the body element, and the support apparatus further comprises a third receiving element in which the third fixed element is inserted, rotated, and fixed.

In even other embodiments, the third fixed element and the third receiving element may fix the fixed apparatus to the support apparatus in a rotation direction on an axis extending in the first direction.

In yet other embodiments, the second fixed element and the second receiving element may fix the fixed apparatus to the support apparatus in counterclockwise rotation on an axis extending in the first direction, and the third fixed element and a third receiving element may fix the fixed apparatus to the support apparatus in clockwise rotation on the axis extending in the first direction.

In further embodiments, a third receiving element may include a groove, and the third fixed element may be located at an end of the groove when the fixed apparatus is fixed to the support apparatus.

In still further embodiments, each of the first fixed element, the second fixed element, and the third fixed element may be provided in a pair, and each of the first receiving element, the second receiving element, and a third receiving element may be provided in a pair.

In even further embodiments, the first fixed element may have a flat plate shape, and the second and third fixed elements may have pin shapes.

In yet further embodiments, a lower surface of the first fixed element may be coplanar with the lower surface of the body element, and an upper surface of the first fixed element may be lower than an upper surface of the body element.

In much further embodiments, the body element may have a cylinder shape, and an outer curved surface of the first fixed element may have the same curvature as that of the outer curved surface of the body element.

In still much further embodiments, the support apparatus may include a cover element that covers the first fixed element when the fixed apparatus is fixed to the support apparatus.

In even much further embodiments, the second receiving element may include a hook, and the second fixed element may be fixed to the hook when the fixed apparatus is fixed to the support apparatus.

In yet much further embodiments, a printed circuit board may be mounted on the fixed apparatus.

In yet much further embodiments, a display apparatus may be mounted on the fixed apparatus.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1A:
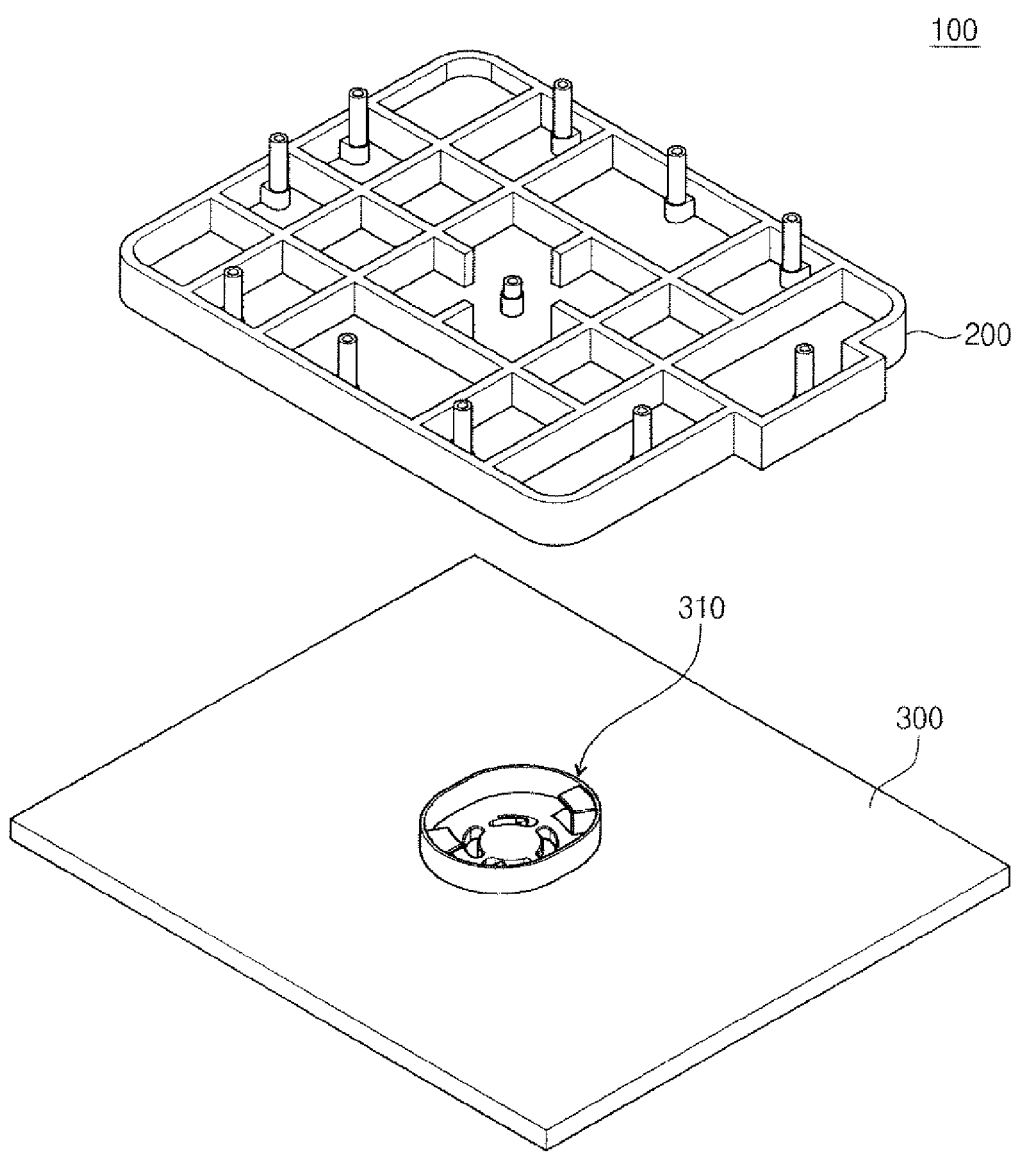
FIGS. 1A and 1B are perspective views illustrating an assembly apparatus according to an embodiment of the inventive concept.

The objects, other objectives, features, and advantages of the inventive concept will be understood without difficulties through preferred embodiments below related to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

In this specification, it will also be understood that when another component is referred to as being 'on' one component, it can be directly on the one component, or an intervening third component may also be present. Like reference numerals refer to like elements throughout.

Additionally, embodiments in the detailed description will be described with sectional views as ideal exemplary views of the inventive concept. In the figures, the dimensions of layers and regions are exaggerated for clarity of illustration. Accordingly, shapes of the exemplary views may be modified according to manufacturing techniques and/or allowable tolerances. Therefore, the embodiments of the inventive concept are not limited to the specific shape illustrated in the exemplary views, but may include other shapes that may be created according to manufacturing processes. Areas exemplified in the drawings have general properties, and are used to illustrate a specific shape of a device region. Thus, this should not be construed as limited to the scope of the inventive concept. Also, though terms like a first, a second, and a third are used to describe various components in various embodiments of the inventive concept, the components are not limited to these terms. These terms are only used to distinguish one component from another component. Embodiments described and exemplified herein include complementary embodiments thereof.

In the following description, the technical terms are used only for explaining a specific exemplary embodiment while not limiting the inventive concept. The terms of a singular form may include plural forms unless referred to the contrary. The meaning of 'comprises' and/or 'comprising' does not exclude other components besides a mentioned component.

Figure 1B:
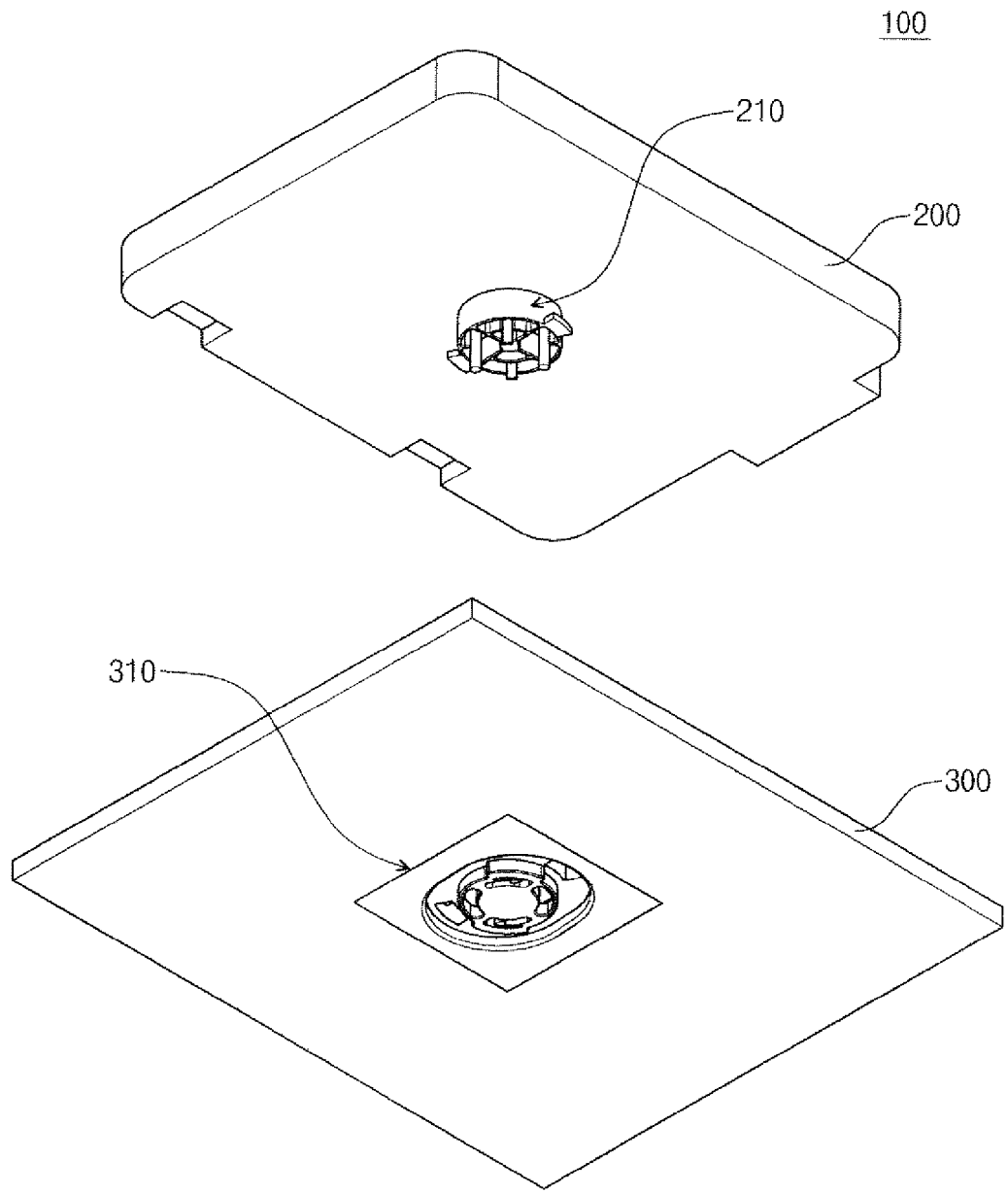

FIGS. 1A and 1B are perspective views illustrating an assembly apparatus according to an embodiment of the inventive concept.

Referring to FIGS. 1A and 1B, an assembly apparatus 100 according to an embodiment of the inventive concept may include a fixed apparatus 200 and a support apparatus 300. The fixed apparatus 200 may be fixed to the support apparatus 300. The support apparatus 300 may support and fix the fixed apparatus 200.

According to an embodiment, a printed circuit board may be mounted on the fixed apparatus 200, so that the printed circuit board can be fixed to the support apparatus 300. According to another embodiment, a display apparatus may be mounted on the fixed apparatus 200, so that the display apparatus can be fixed to the support apparatus 300.

The fixed apparatus 200 may include a fixed region 210 including a plurality of fixed elements. The support apparatus 300 may include a receiving region 310 including receiving elements to which the fixed elements are inserted and fixed. The fixed elements are inserted in the receiving elements respectively, so that the fixed apparatus 200 can be fixed to the support apparatus 300. This will now be described in detail with reference to FIGS. 2A, 2B, 3A, and 3B.

Figure 2A:
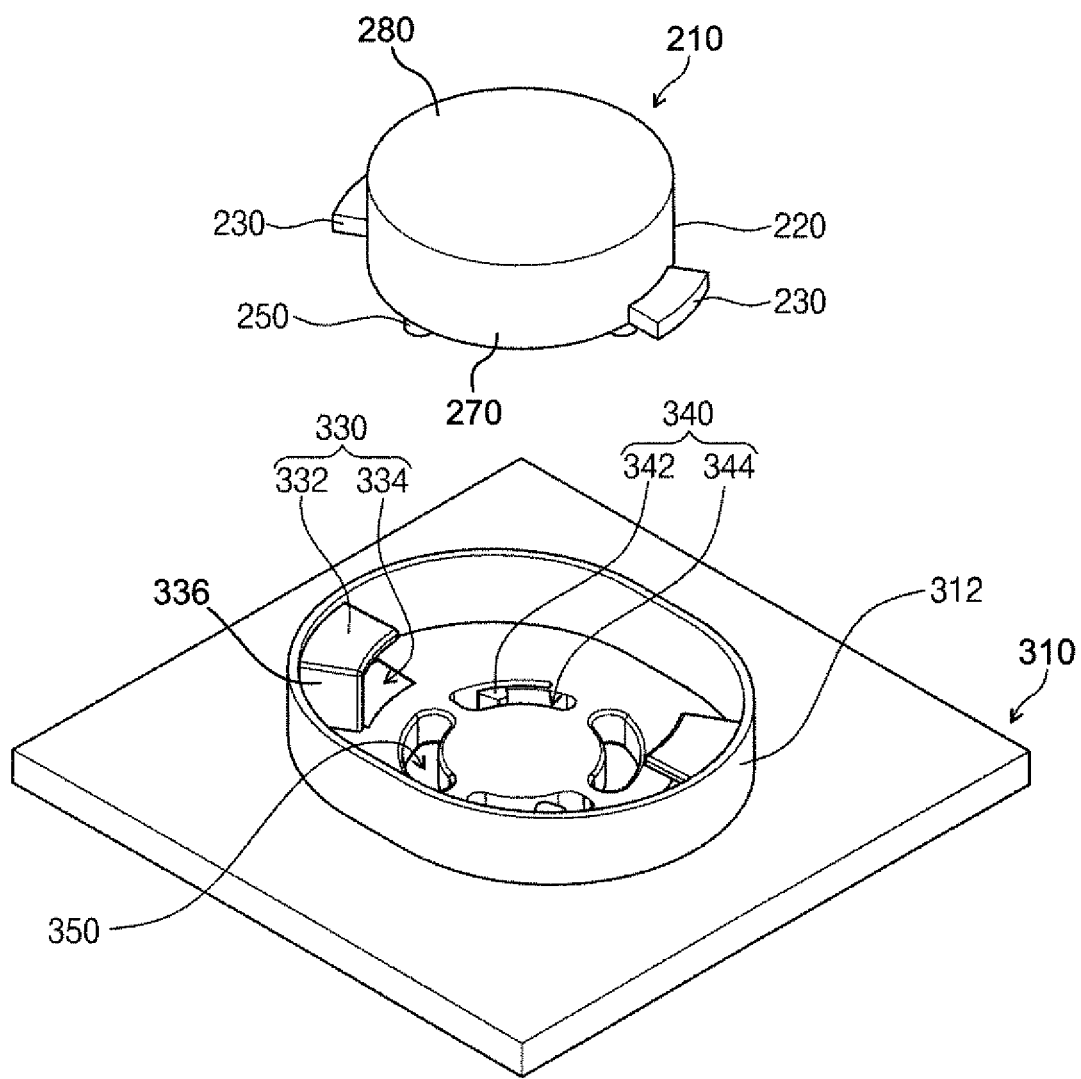
FIGS. 2A and 2B are enlarged views illustrating a fixed region of a fixed apparatus and a receiving region of a support apparatus of FIGS. 1A and 1B, according to an embodiment of the inventive concept.
Figure 2B:
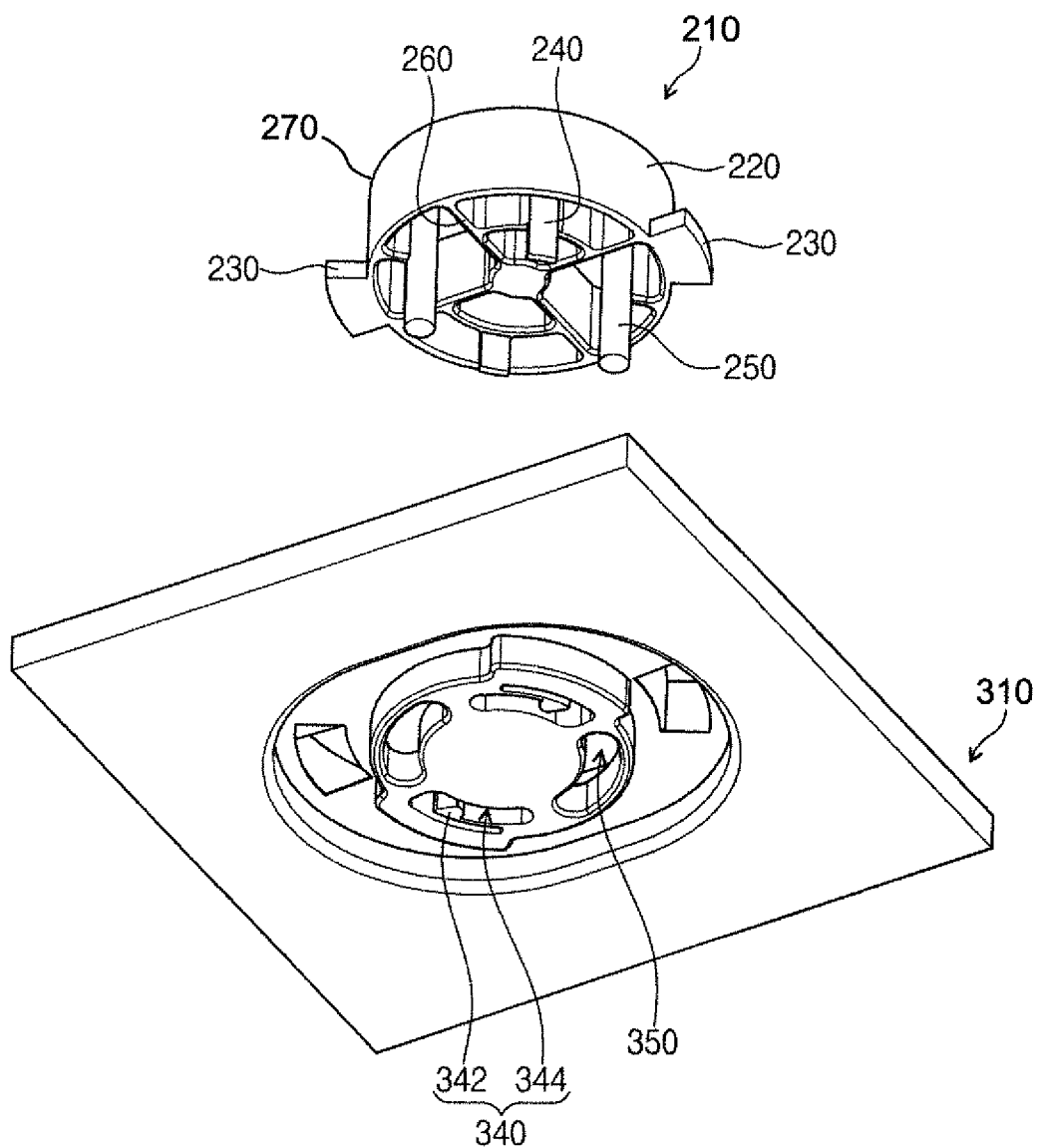

FIGS. 2A and 2B are enlarged views illustrating the fixed region 210 of the fixed apparatus 200 and the receiving region 310 of the support apparatus 300 of FIGS. 1A and 1B, according to an embodiment of the inventive concept.

Referring to FIGS. 2A and 2B, the fixed region 210 may include a body element 220, a first fixed element 230, a second fixed element 240, and a third fixed element 250. According to an embodiment, each of the first fixed element 230, the second fixed element 240, and the third fixed element 250 may be provided in respective pairs.

The body element 220 may have a cylinder shape with a side wall 270 and an upper cover 280 covering the side wall 270. The side wall 270 may extend from the edge of the upper cover 280 in a first direction that is vertical to the upper surface of the upper cover 280. The body element 220 may have an upper surface, a lower surface, and an outer curved surface. The upper surface of the body element 220 may constitute the upper surface of the upper cover 280. The outer curved surface of the body element 220 may constitute the outer surface of the side wall 270. An inner hollow space surrounded by the side wall 270 may be defined inside the body element 220. In this case, an end of the side wall 270, which is not connected to the edge of the upper cover 280, may constitute the lower surface of the body element 220. Alternatively, the body element 220 may be provided in the form of a solid rod.

The first fixed element 230 may extend from the outer curved surface of the body element 220 in the radial direction of the upper surface of the body element 220. The first fixed element 230 may protrude outward from the body element 220. The first fixed element 230 may have a flat plate shape. An upper surface of the first fixed element 230 may be lower than the upper surface of the body element 220. A lower surface of the first fixed element 230 may be coplanar with the lower surface of the body element 220. The first fixed element 230 may have a fan shape. When the body element 220 has a cylinder shape according to an embodiment, the outer surface of the first fixed element 230 and an outer side curved surface of the body element 220 may have the same curvature.

The second fixed element 240 may have a pin shape (e.g., rectangular prism shape or cylinder sidewall segment shape) and extend in the first direction. The second fixed element 240 may have one end connected to the body element 220 and the other end protruding from the lower surface of the body element 220. When the body element 220 has a hollow cylinder shape, the one end of the second fixed element 240 may be connected to the upper cover 280 of the body element 220. Alternatively, when the body element 220 has a solid rod shape, the one end of the second fixed element 240 may be connected to the lower surface of the body element 220. According to an embodiment, a cross-section of the second fixed element 240 cut by a plane having a normal line extending in the first direction may be polygonal or may be fan shaped.

The third fixed element 250 may have a pin shape (e.g., cylindrical shape) and extend in the first direction. The third fixed element 250 may have one end connected to the body element 220 and the other end protruding from the lower surface of the body element 220. When the body element 220 has a hollow cylinder shape, the one end of the third fixed element 250 may be connected to the upper cover 280 of the body element 220. Alternatively, when the body element 220 has a solid rod shape, the one end of the third fixed element 250 may be connected to the lower surface of the body element 220. According to an embodiment, a cross-section of the third fixed element 250 cut by a plane having a normal line extending in the first direction may be circular.

The fixed region 210 may include a prop element 260 that fixes the first fixed element 230 and the second fixed element 240 to the body element 220. The prop element 260 may be connected to the upper cover 280 and/or the side wall 270 of the fixed region 210 to fix the first fixed element 230 and the second fixed element 240 to the body element 220. The prop element 260 may not protrude out of the lower surface of the body element 220.

The receiving region 310 may include a first receiving element 330 receiving the first fixed element 230, a second receiving element 340 receiving the second fixed element 240, and a third receiving element 350 receiving the third fixed element 250. When each of the first to third fixed elements 230, 240, and 250 is provided in pairs, each of the first to third receiving elements 330, 340, and 350 may be provided corresponding in pairs. Although each of the first to third fixed elements 230, 240, and 250 and the first to third receiving elements 330, 340, and 350 may be provided in pairs in FIGS. 2A and 2B, each of the first to third fixed elements 230, 240, and 250 and the first to third receiving elements 330, 340, and 350 may be provided in triplicate or more.

The receiving region 310 may include a fence element 312 protruding upward from the upper surface of the receiving region 310. The fence element 312 may surround the first to third receiving elements 330, 340, and 350. The first to third receiving elements 330, 340, and 350 may be disposed inside the fence element 312.

The first receiving element 330 may be defined by a cover element 332 and a first groove 334 defined under the cover element 332. The cover element 332 may extend from an upper end of the fence element 312 or from a region adjacent to the upper end of the fence element 312 to the inside of the fence element 312. The first groove 334 may pass through a portion of the receiving region 310 surrounded by the fence element 312. When the first fixed element 230 is inserted, rotated and fixed in the first receiving element 330, the cover element 332 covers the upper surface of the first fixed element 230.

Alternatively, the first groove 334 may not pass through a portion of the receiving region 310 surrounded by the fence element 312. In this case, the first groove 334 may be defined between the upper surface of the receiving region 310 and the cover element 332. Here, a stop element 336 extending in the first direction from the cover element 332 blocks, or stops, the rotation of the fixed element 230 inserted into the first groove 334.

The second receiving element 340 may include a hook 342 and the second groove 344 passing through a portion of the receiving region 310 surrounded by the fence element 312. From a plan view, the second groove 344 may extend and bend with a constant curvature. For example, the curvature of the second groove 344 may be substantially the same as that of the outer curved surface of the body element 220. The hook 342 may extend in an extension direction of the second groove 344. The hook 342 may be disposed in the second groove 344. The hook 342 may include an extension portion connected to an end of the second groove 344, and a hanger portion formed at an end of the extension portion. The hanger portion may be adjacent to the other end of the second groove 344.

The third receiving element 350 may be a third groove passing through a portion of the receiving region 310 surrounded by the fence element 312. From a plan view, the third groove may extend and bend with a constant curvature. The curvature of the third groove may be substantially the same as that of the second groove 344.

The first to third fixed elements 230, 240, and 250 may be inserted, rotated, and fixed in the first to third receiving elements 330, 340, and 350, respectively. Accordingly, the fixed region 210 including the first to third fixed elements 230, 240, and 250 can be stably fixed to the receiving region 310 including the first to third receiving elements 330, 340, and 350. This will be described in detail with reference to FIGS. 3A and 3B.

Figure 3A:
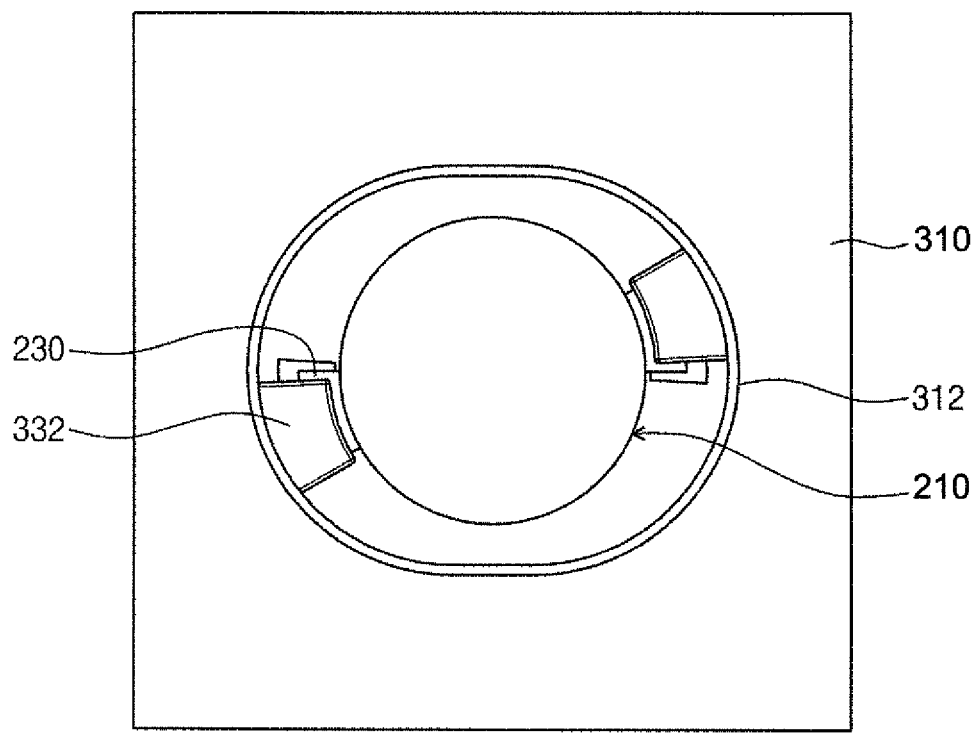
FIGS. 3A and 3B are enlarged views illustrating the fixed region of the fixed apparatus and the receiving region of the support apparatus of FIGS. 1A and 1B in a state where the fixed apparatus is fixed to the support apparatus according to an embodiment of the inventive concept.
Figure 3B:
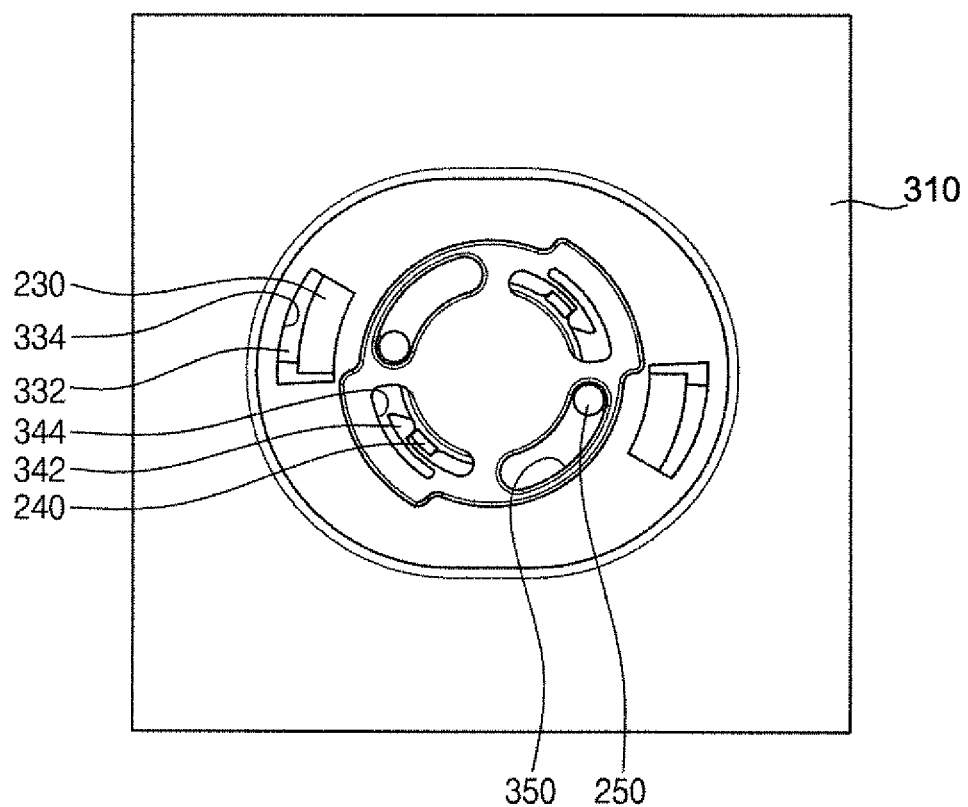

FIGS. 3A and 3B are enlarged views illustrating the fixed region 210 of the fixed apparatus 200 and the receiving region 310 of the support apparatus 300 of FIGS. 1A and 1B in a state where the fixed region 210 is fixed to the receiving region 310 according to an embodiment of the inventive concept.

Referring to FIGS. 2A, 2B, 3A and 3B, the first fixed elements 230 may be inserted and rotated in the first receiving elements 330, and the cover elements 332 may cover the upper surfaces of the first fixed elements 230. Accordingly, the fixed region 210 may be fixed in the first direction to the receiving region 310.

The second fixed elements 240 may be inserted in the second grooves 344 of the second receiving elements 340, and then, may be rotated about an axis extending in the first direction, and may be fixed to the hooks 342 of the second receiving elements 340. Accordingly, the fixed region 210 may be fixed to the receiving region 310 in a rotation direction about the axis extending in the first direction.

The third fixed elements 250 may be inserted, rotated, and fixed in the third receiving elements 350. When the third fixed element 250 is fixed to the third receiving element 350, the third fixed element 250 may be located at an end of the third receiving elements 350. Accordingly, the fixed region 210 is fixed to the receiving region 310 in a rotation direction about the axis extending in the first direction.

The rotation direction that the second fixed element 240 and the second receiving element 340 fix the fixed region 210 to the receiving region 310 may be different from the fixed direction that the third fixed element 250 and the third receiving element 350 fix the fixed region 210 to the receiving region 310. For example, the second fixed element 240 and the second receiving element 340 may fix the fixed region 210 to the receiving region 310 in a counterclockwise rotation about the axis extending in the first direction. In this case, the third fixed element 250 and the third receiving elements 350 may fix the fixed region 210 to the receiving region 310 in a clockwise rotation about the axis extending in the first direction. Accordingly, the fixed region 210 fixed to the receiving region 310 is prevented from clockwise rotation and counterclockwise rotation on the axis extending in the first direction.

According to the embodiment, the first to third fixed elements 230, 240, and 250 may be inserted, rotated, and fixed in the first to third receiving elements 330, 340, and 350, respectively. Accordingly, the fixed region 210 including the first to third fixed elements 230, 240, and 250 are stably fixed to the receiving region 310 including the first to third receiving elements 330, 340, and 350.

Figure 4:
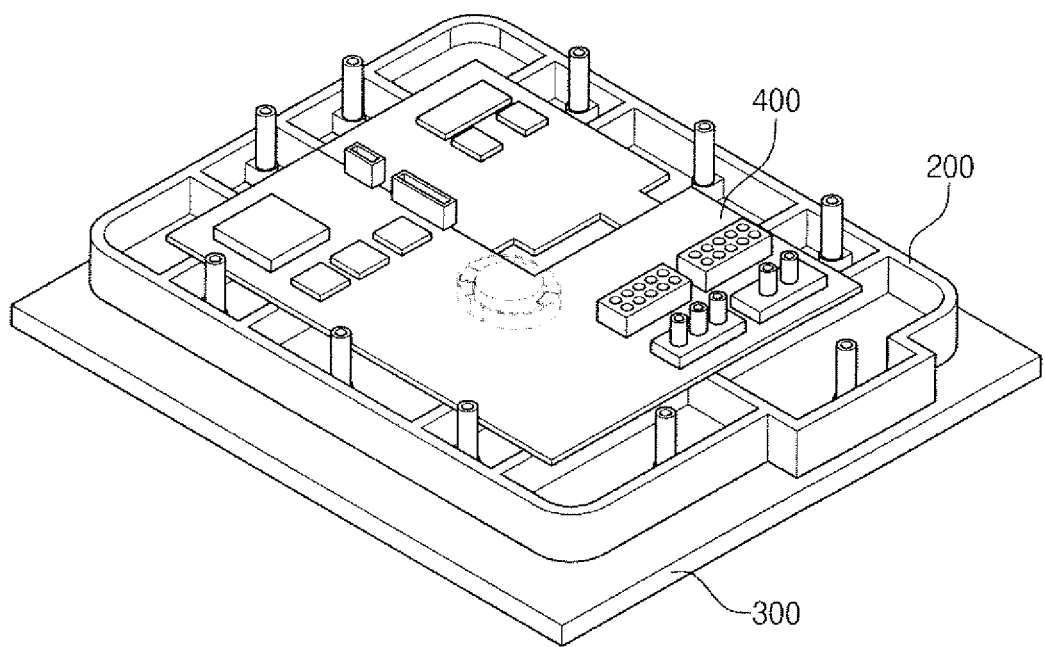
FIG. 4 is a perspective view illustrating an application of an assembly apparatus according to an embodiment of the inventive concept.

FIG. 4 is a perspective view illustrating an application of an assembly apparatus according to an embodiment of the inventive concept.

Referring to FIG. 4, the fixed apparatus 200 and the support apparatus 300 are provided according to an embodiment of the inventive concept. An electronic component 400 may be mounted on the fixed apparatus 200. According to an embodiment, the electronic component 400 may be a printed circuit board that includes a plurality of electronic chips and/or a plurality of terminals. The fixed apparatus 200 on which the electronic component 400 is mounted is stably fixed to the support apparatus 300, as illustrated in FIGS. 1A, 1B, 2A, 2B, 3A, and 3B.

Figure 5:
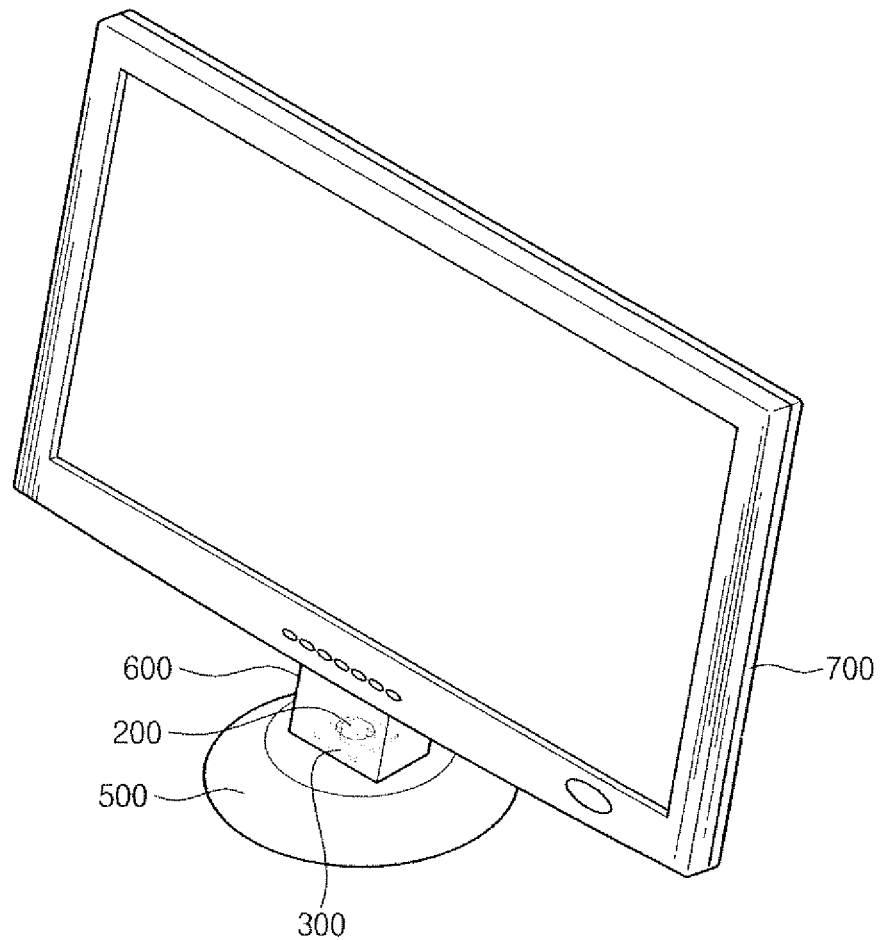
FIG. 5 is a perspective view illustrating an application of an assembly apparatus according to an embodiment of the inventive concept.

FIG. 5 is a perspective view illustrating an application of an assembly apparatus according to an embodiment of the inventive concept.

Referring to FIG. 5, the support apparatus (300) includes a base apparatus 500 having the receiving region 310, the fixed apparatus (200) includes a connection apparatus 600 having the fixed region 210, and a display apparatus 700 is mounted on the connection element 600. The fixed region 210 can be fixed to the receiving region 310, as illustrated in FIGS. 2A, 2B, 3A, and 3B. Accordingly, the display apparatus 700 is stably fixed to the base apparatus 500. According to an embodiment, the display apparatus 700 may be a TV or a computer monitor. According to another embodiment, the display apparatus 700 may be a display apparatus such as, but not limited to, a liquid crystal display apparatus or an organic light emitting display apparatus.

According to the embodiment of the inventive concept, the assembly apparatus includes the fixed apparatus having the fixed region that includes at least the body element, the first fixed element protruding from the outer curved surface of the body element in the radial direction of the body element, and the second fixed element extending in the first direction that is vertical to the radial direction of the body element, and the assembly apparatus includes the support apparatus having the receiving region that includes at least the first receiving element in which the first fixed element is inserted, rotated, and fixed, and the second receiving element in which the second fixed element is inserted, rotated, and fixed. Thus, the first and second fixed elements of the fixed apparatus can be stably fixed to the first and second receiving elements of the support apparatus.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An assembly apparatus comprising:
    a fixed apparatus having a fixed region that includes a body element, a first fixed element protruding from an outer curved surface of the body element in a radial direction of the body element, and a second fixed element extending in a first direction that is vertical to the radial direction of the body element; and
    a support apparatus having a receiving region that includes a first receiving element in which the first fixed element is inserted, rotated, and fixed, and a second receiving element in which the second fixed element is inserted, rotated, and fixed,
    wherein an end of the second fixed element is connected to the body element, and another end of the second fixed element protrudes from a lower surface of the body element, and wherein the fixed region includes a third fixed element extending in the first direction and spaced apart from the second fixed element,
    an end of the third fixed element is connected to the body element, and
    another end of the third fixed element protrudes from the lower surface of the body element,
    wherein the receiving region further includes a third receiving element in which the third fixed element is inserted, rotated, and fixed.

2. The assembly apparatus of claim 1, wherein the first fixed element and the first receiving element fix the fixed apparatus to the support apparatus in the first direction.

3. The assembly apparatus of claim 1, wherein the second fixed element and the second receiving element fix the fixed apparatus to the support apparatus in a rotation direction about an axis extending in the first direction.

4. The assembly apparatus of claim 1, wherein the third fixed element and the third receiving element fix the fixed apparatus to the support apparatus in a rotation direction about an axis extending in the first direction.

5. The assembly apparatus of claim 4, wherein the second fixed element and the second receiving element fix the fixed apparatus to the support apparatus in counterclockwise rotation about the axis extending in the first direction, and
    the third fixed element and a third receiving element fix the fixed apparatus to the support apparatus in clockwise rotation about the axis extending in the first direction.

6. The assembly apparatus of claim 1, wherein the third receiving element comprises a groove, and
    the third fixed element is located at an end of the groove when the fixed apparatus is fixed to the support apparatus.

7. The assembly apparatus of claim 1, wherein each of the first fixed element, the second fixed element, and the third fixed element is provided in pairs, and
    each of the first receiving element, the second receiving element, and the third receiving element is provided in pairs.

8. The assembly apparatus of claim 1, wherein the first fixed element has a flat fan shape, and the second and third fixed elements have pin shapes.

9. The assembly apparatus of claim 8, wherein a lower surface of the first fixed element is coplanar with the lower surface of the body element, and
    an upper surface of the first fixed element is lower than an upper surface of the body element.

10. The assembly apparatus of claim 8, wherein the body element has a cylinder shape, and
    an outer curved surface of the first fixed element has the same curvature as that of the outer curved surface of the body element.

11. The assembly apparatus of claim 8, wherein the support apparatus comprises a cover element that covers the first fixed element when the fixed apparatus is fixed to the support apparatus.

12. The assembly apparatus of claim 1, wherein the second receiving element comprises a hook, and
    the second fixed element is fixed to the hook when the fixed apparatus is fixed to the support apparatus.

13. The assembly apparatus of claim 1, wherein a printed circuit board is mounted on the fixed apparatus.

14. The assembly apparatus of claim 1, wherein a display apparatus is mounted on the fixed apparatus.

* * * * *